April 29, 1924.
L. DINESEN
MILKING APPARATUS
Filed April 3, 1919    3 Sheets-Sheet 1
1,491,791
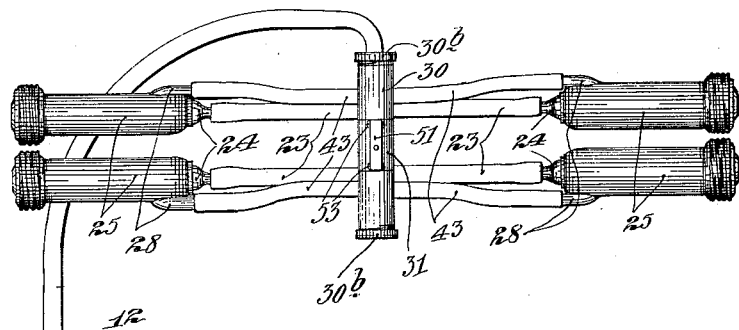
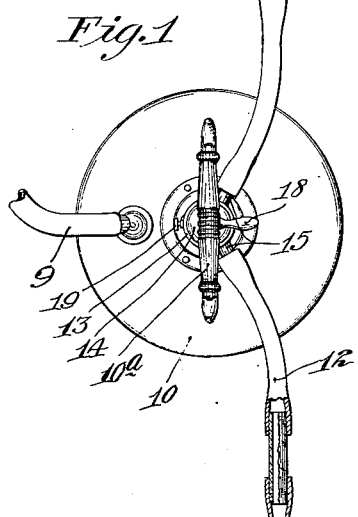
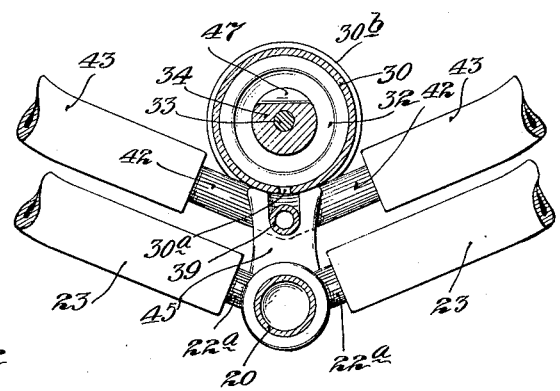
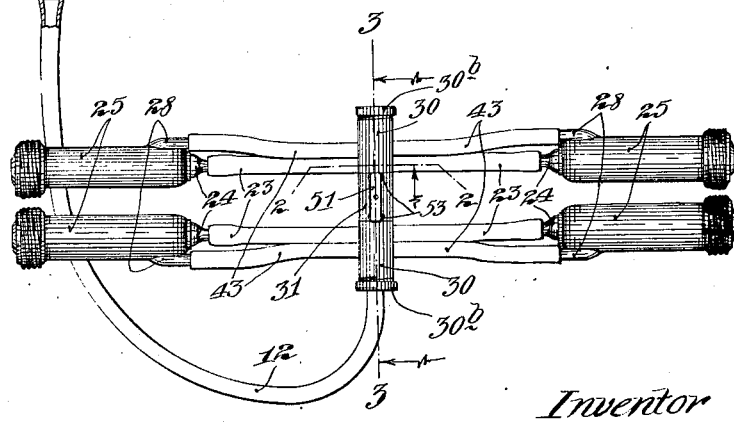
Fig.1   Fig.2
Inventor
Laurits Dinesen
By his Attorneys
Williamson & Merchant

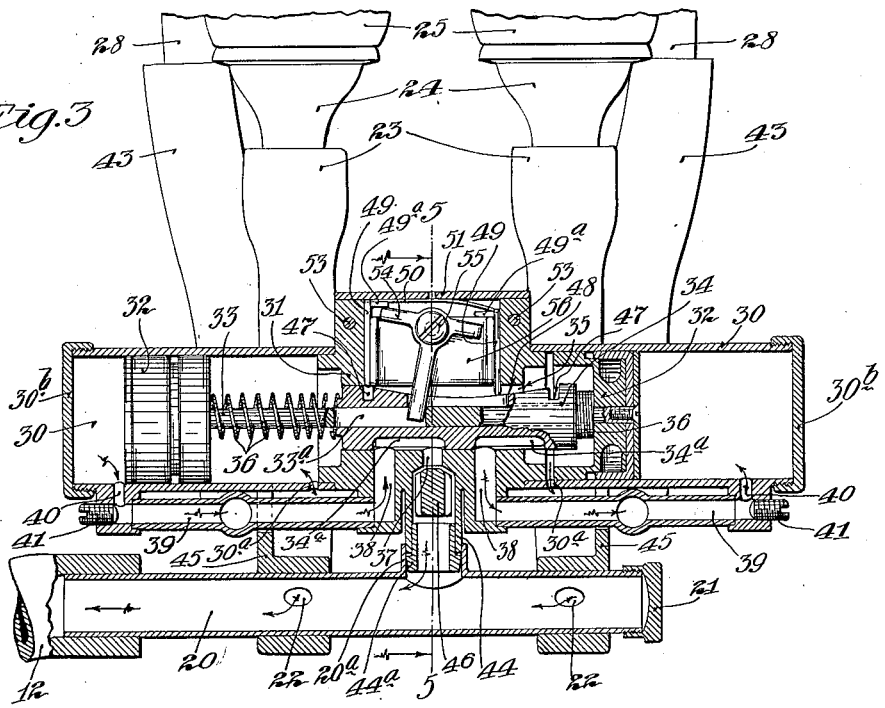

April 29, 1924.
L. DINESEN
MILKING APPARATUS
Filed April 3, 1919    3 Sheets-Sheet 3
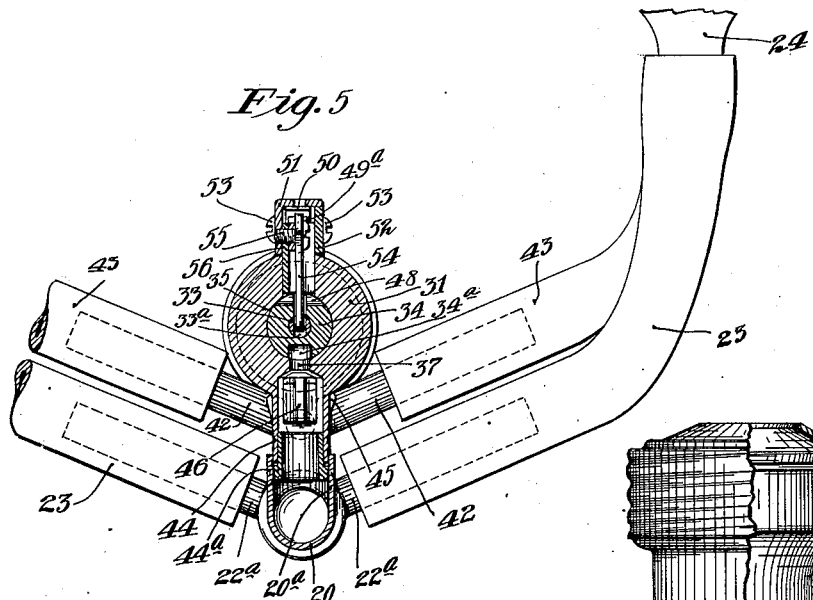
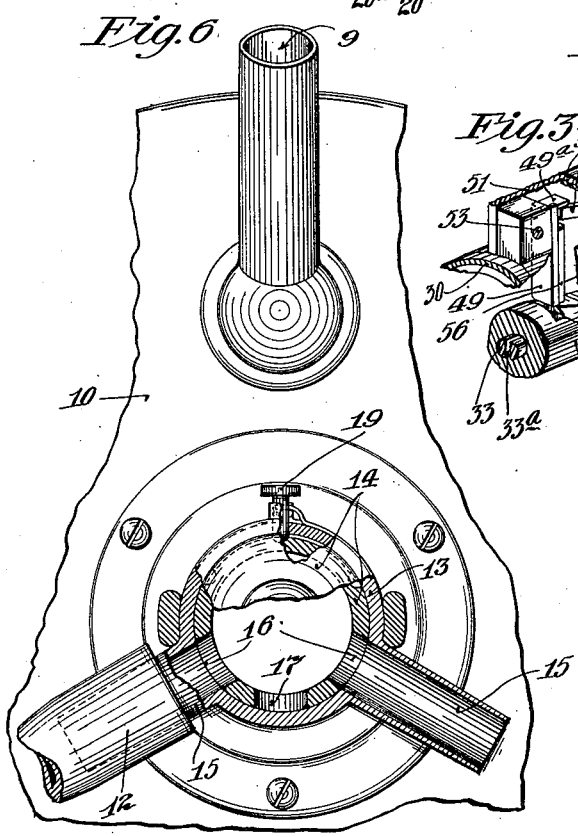
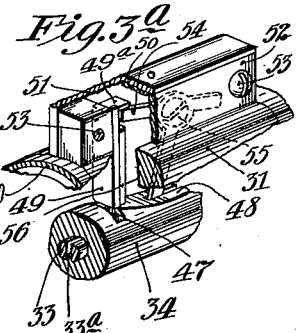
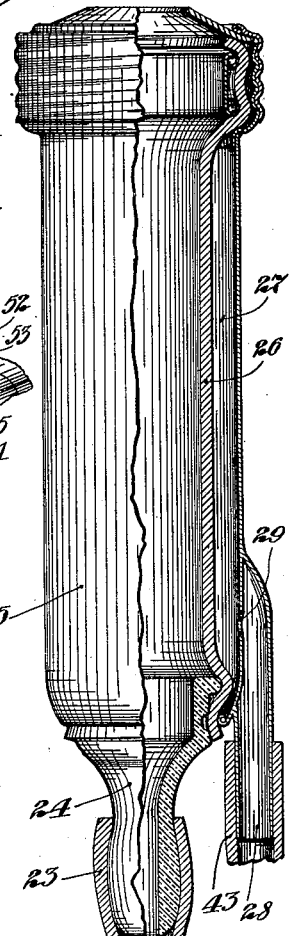
Inventor
Laurits Dinesen
By his Attorneys

Patented Apr. 29, 1924.

1,491,791

UNITED STATES PATENT OFFICE.

LAURITS DINESEN, OF MINNEAPOLIS, MINNESOTA, ASSIGNOR, BY MESNE ASSIGNMENTS, TO PERFECTION MANUFACTURING COMPANY, OF MINNEAPOLIS, MINNESOTA, A CORPORATION OF MINNESOTA.

MILKING APPARATUS.

Application filed April 3, 1919. Serial No. 287,256.

*To all whom it may concern:*

Be it known that I, LAURITS DINESEN, citizen of the United States, residing at Minneapolis, in the county of Hennepin and State of Minnesota, have invented certain new and useful Improvements in Milking Apparatus; and I do hereby declare the following to be a full, clear, and exact description of the invention, such as will enable others skilled in the art to which it appertains to make and use the same.

My invention relates to milking apparatus and provides highly important novel features whereby very greatly improved results are obtained, in the operation of such apparatus. Generally stated, the invention consists of the novel devices and combinations of devices, hereinafter described and defined in the claims.

The drawings illustrate a commercial form of the improved milking apparatus, and in the description of said drawings, like notations indicate like parts throughout the several views. Referring to the drawings:—

Fig. 1 is a plan view illustrating the apparatus and showing what may be treated as one unit, or rather, a sort of double unit consisting of one milk pail or receptacle, two groups of teat cups, and a pulsator for each group of teat cups;

Fig. 2 is an enlarged vertical section on the line 2—2 of Fig. 1;

Fig. 3 is an enlarged vertical section on the line 3—3 of Fig. 1, illustrating the construction of one of the pulsators and immediately connected parts;

Fig. 4 is a view partly in side elevation and partly in vertical section, and with some parts broken away, showing portions of the milk pail or receptacle, the cover therefor, and the valve connection between the milk tube and pail;

Fig. 5 is a transverse vertical section taken approximately on the line 5—5 of Fig. 3;

Fig. 6 is a view partly in plan and partly in horizontal section on the line 6—6 of Fig. 4;

Fig. 7 is a view partly in plan and partly in axial section, and showing one of the teat cups; and Fig. 3ª is a fragmentary perspective view showing one of the lock dogs and the guide thereof.

In this apparatus, as in the apparatus disclosed in my prior Patent No. 1,117,169, of date November 17, 1914, I employ a milk pail or receptacle 8, in which a partial vacuum is maintained by suitable means such as an air tube 9, extended from a nipple on the top of the pail cover 10, and connected to a vacuum pump or vacuum tank. Of course, the joint between the pail and cover will be kept air tight by a gasket 11, or other suitable device so that a partial vacuum will be constantly maintained in the pail or milk receptacle.

For each group of teat cups, there is a single tube that is a combined milk and air tube 12, which tubes are connected to the interior of the pail through the cover 10, by means of a valve mechanism which in itself involves novel features. This valve mechanism, as shown, comprises a cylindrical casing 13 secured to the cover 10, and open therethrough at its lower end. Working in the casing 13, is a hollow valve 14 closed at its top but open into the pail at its lower end. The casing 13, has two radially extended nipples 15, to each of which one of the tubes 12 is attached. The inner extremities of nipples 15, afford ports that are adapted to register with ports 16—16 and 17 in the valve 14. The arrangement of said ports and nipples is such that when the valve, by means of its handle 18, is set in the position shown in Fig. 6, both milk tubes will be connected to the interior of the pail; when the port 17 is turned into communication with either of the nipples 15, one of the milk tubes will be cut out of action, while the other will be left in action or connected to the pail; and when the said valve 14 is moved 180 degrees from the position shown in Fig. 6, both of the milk tubes will be cut out of action.

The numeral 19 indicates a spring pressed pin radially mounted in the casing 13 and engageable with depressions in the valve 14, to yieldingly hold said valve in its various set positions against accidental movements therefrom.

As a highly important feature of the present invention, I provide at the extended or receiving end of the milk line tube or tube that serves as a combined milk tube and air tube, a pulsator mechanism including a vacuum motor and valve mechanism actuated thereby, the said pulsator mechanism, as an entirety, being common to or controlling pulsations in all of the teat cups of the group. In the first place, it makes possible the use of so-called two-chamber teat cups, that is, the cups having collapsible and expansible elements, and means for expanding and contracting the same to simulate the natural milking action, and to use therewith, a single combined milk or air tube. By "combined milk and air tube," I mean a tube connecting the group of teat cups to the milk receptacle, in which partial vacuum is maintained or produced, to draw the milk through this tube and, moreover, to transmit the partial vacuum from the milk receptacle to the pulsator and teat cups through this same tube, all as will presently more fully appear.

The drawings illustrate what has been designated as a "double unit milking apparatus," that is, an apparatus having two groups of teat cups adapted to simultaneously milk two cows, but it will be sufficient to describe but one group of such teat cups and one co-operating pulsator device.

The extended end of the flexible milk tube 12, is connected to one end of a metallic coupling tube 20 of the teat cup coupler head. The extended end of the coupling tube 20 is closed by a cap 21. This tube 20 has four ports 22 that lead to nipples 22ª and these nipples are connected by flexible branch milk tubes 23 to nipples 24 on the ends of the respective teat cups 25. These teat cups are preferably of the character disclosed and claimed in my prior Patent No. 1,201,808 of date, October 17, 1916, and the said teat cups are provided with tubular rubber inner walls or shells 26, that are collapsible and expansible, and are spaced from the outer shells of the teat cups to afford annular air chambers 27. The air chambers 27 are connected to nipples 28 on the outer shells of the teat cups, through ports 29.

The pulsator which controls the group of teat cups comprises axially aligned cylinders 30, rigidly secured to a centrally located metallic block 31, which in turn, is connected, preferably detachably, to the coupling tube 20 in a manner which will be presently noted.

Working in the cylinders 30, are pistons 32 that are connected by an axial stem 33 passed through block 31. Mounted to slide on the intermediate portion of the piston rod 33, but held against rotation thereon, is a sleeve-like controller or valve 34, which valve works through and is seated against the lower walls of a passage 35, formed in the block 31 concentric to the axis of piston rod 33. For an important purpose, coiled springs 36 placed around the end of the piston rod 33, are compressed between the respective pistons and the adjacent ends of the valve 34. Block 31 is provided with three ports 37 and 38—38 the two latter being connected by tubes 39 to ports 40, which latter open into the outer end portions of the cylinders 30. Choke valves 41 are applied to the cylinder castings adjacent to ports 40, to vary the cross section of the passage at those points and thus regulate the speed of movement of the piston, as will presently more clearly appear.

The air tubes 39 are provided with laterally projecting nipples 42, which by means of branch air tubes 43, are connected to the air nipples 28 of the respective teat cups.

Intermediate port 37 leads to a depending coupling tube 44, shown as provided with a flanged bushing 44ª. This coupling tube 44 and its bushing 44ª are adapted to be telescoped with air tight engagement into a vertically projecting sleeve 20ª of the coupling tube 20. The coupling tube 20 is provided with upwardly projecting lugs 45 which at their upper ends are bifurcated to embrace the air tube 39 and thus the pulsator is detachably supported from the coupling tube 20.

The numeral 46 indicates a check valve placed in the tube 44 above its bushing 44ª. Normally, this check valve will stand in a lowered or open position, but will be raised or moved to closed port 37 whenever there is an attempted flow of milk from the tube 20 toward the port 37.

The controller valve 34 near its ends and on its upper portion, is provided with lock notches 47, and between these notches, is formed with a depressed cam surface 48. Mounted to slide vertically in the recessed upper portion of the block 31, is a pair of longitudinally spaced lock dogs 49, the lower ends of which, in a manner hereinafter described, co-operate with the respective lock notches 47 of the valve 34. At their upper ends, these dogs 49 are yieldingly pressed downward, as shown, by a leaf spring 50, seated against the top flange of an L-shaped plate 51. This plate 51 and a flat side plate 52, are detachably secured by screws or bolts 53 to upwardly projected longitudinally spaced portions of the block 31, so that the said elements 51 and 52 constitute the sides and top of the housing in which the dogs 49 and certain other parts, are mounted. For operating the dogs, I provide a three-armed lever 54, shown as pivoted by a stud 55 to an upright U-shaped plate 56. This plate 56 is rigidly secured to the depending flange of plate 51 and to the interior of the block 31, and its end flanges are spaced from the end lugs of said block, so as to afford guide channels for the dogs 49. At their upper ends, dogs 49 are provided with laterally projecting lips 49ª that rest on the ends of the upper arm of the lever 54. The depending arm of said lever 54 works through a clearance slot in the top of the valve 34, and projects into an elongated slot 33ª of the piston rod 33.

It is highly important to note that the controller valve 34 in its under side, is provided with two longitudinally spaced ports 34ª. It will also be noted that cylinders 30 near their inner extremities, have ports 30ª that open to the atmosphere, and that the outer ends of said cylinders are closed by heads 30ᵇ.

Fig. 4 shows the numeral 10ª, which indicates a suitable handle applied to the pail cover 10.

Operation.

The operation of the apparatus is substantially as follows:—Constant partial vacuum will be maintained in the milk pail, and as stated, this of course, will produce a partial vacuum or suction in the coupling tube 20, branch milk tubes 23 and in the inner chambers of the teat cups. In the position of the controller valve 34, shown in Fig. 3, left hand port 34ª connects central port 37 to left hand port 38, thus connecting the two left hand teat cups and the outer end of left hand cylinder 30 to tube 20, so that at this time air will be drawn from the outer chambers of the two left hand teat cups into the said tube 20, and from thence through the common milk tube 12 into the milk pail; and at the same time, right hand port 34ª connects right hand port 38 to the atmosphere through the inner end of right hand cylinder and right hand port 30ª. This opening of right hand port 38 allows air to rush into right hand tube 39 and from thence through the right hand air tubes 43 into the outer annular chambers 27 of the right hand teat cups, thereby contracting the tubular shells 26 of the said two teat cups, and producing a squeezing action that closely approximates that produced in the hand milking action.

In the position of the parts just described and shown in Fig. 3, the left hand lock dog 49ª has just been lifted out of the left hand notch 47, so that right hand spring 36 which is then compressed, will immediately throw the said valve 34 toward the left to a position in which right hand dog 49 will engage right hand notch 47, and then temporarily lock said valve 34 in a position in which the relation of parts just described, will be reversed, that is, to a position in which right hand port 34ª will connect intermediate port 37 to right hand port 38, and left hand port 34ª will connect left hand port 38 to the atmosphere through left hand atmospheric port 30ª. In this last noted position of the said valve 34, the annular air chambers of the two right hand teat cups will then be connected to tube 20 and thus subjected to partial vacuum, which will be effective on the flexible inner casing 26, and at the same time, outer end of the left hand cylinder 30 and the annular chambers of the two left hand teat cups will be connected to the atmosphere. In the above description, it is assumed that the left hand air tube 39 is connected to two teat cups located on one side, and that the right hand air tube 39 is connected to two teat cups located on the other side, but of course, the said teat cups may be cross connected if desired.

When the outer end of left hand cylinder 30 is open to the atmosphere and the outer end of the right hand cylinder 30 is subjected to partial vacuum as just described, the pistons will be simultaneously moved toward the right, but the controller valve 37 will be held stationary by the right hand dog 49, while the left hand spring 33 is being compressed, and until left hand extremity of piston rod slot 33ª strikes the lower end of the depending arm of lever 54, and thereby causes the upper right hand arm of said lever to lift said right hand dog out of right hand notch 47, thereby again freeing the said controller valve 34, and permitting the same to be quickly moved toward the right by the action of the compressed left hand spring 33. As valve 34 reaches the limit of its movement toward the right the cam surface 35 of said valve, acting on left hand dog 49 will lift the same and then allow the said left hand dog to engage left hand notch 47 and again temporarily lock the said valve against return movement. The reason that either of the springs 36 when compressed, as above described, will move valve 34 as stated, rather than the pistons, is that the friction between the pistons and the cylinders greatly exceeds the friction between controller valve 34 and its seat.

When the piston is moved by partial vacuum in either direction, the air in the end of the cylinder against which the piston is being moved will be drawn through the corresponding air tube 39, into the coupling tube 20, where it will co-mingle with the milk and will be drawn with the milk through the common tube 12 into the milk pail. This is why the single tube can be used both as a milk tube and a tube for producing the pulsating action by operation of the distant pulsating device. Another important result has been noted in practice, to wit, that air thus drawn with the milk, will hasten the flow of the milk to the pail.

To clean the pulsating mechanism and co-operating connections, the pulsator may be readily removed bodily, simply by lifting the same from the forked lugs 45 and pulling tube 44 out of the sleeve 20ª.

When in actual practice, this milking apparatus has been found very highly efficient from all points of view.

With a pulsator mechanism connected to or closely associated with the teat cups, it is necessary that the pulsator be removed and the teat cups and connections be frequently washed in antiseptic liquid. For this reason, it is of the utmost importance that the pulsator be readily detachable, that is, capable of being simply picked up or pulled off from its operative connection to the teat cups. This provision is made in the above described apparatus.

What I claim is:—

1. In a milking apparatus, the combination with a milk receptacle and a milk line tube extended therefrom, of a group of double chamber teat cups at the extended end of said milk line tube, a common pulsator mechanism for said group of teat cups, also located at the extended end of said milk line tube, said pulsator mechanism comprising a reciprocating vacuum motor and valve mechanism actuated thereby, the inner chambers of said teat cups being in constant connection with said milk line tube and subject to substantially constant vacuum, and said valve mechanism operative to intermittently connect the outer chambers of the teat cups of said group to the atmosphere, and alternately therewith to intermittently connect said vacuum motor and the outer chambers of said group of teat cups to said milk line tube.

2. In a milking apparatus, the combination with a receptacle in which partial vacuum is maintained, of a milk line tube extended therefrom and serving as a combined air and milk tube, a group of double chamber teat cups connected to the extended end of said milk line tube, a common pulsator mechanism for the said group of teat cups also connected to the extended end of said milk line tube, said pulsator mechanism being operated by partial vacuum rendered effective thereon through said milk line tube and operative to produce pressure pulsations in the outer chambers of said teat cups while subjecting the inner or milk chambers of said teat cups to substantially constant partial vacuum.

3. A pulsator mechanism for a milking apparatus comprising co-axial cylinders and co-operating pistons, a valve seat connected between said cylinders, a controller valve located between and co-axial with said pistons, said valve seat and valve having co-operating ports for producing pressure pulsations and for controlling the movements of said pistons, locks for temporarily securing said valve in extreme positions, a trip for said locks operated by extreme movements of said pistons, and opposing springs interposed between said valve and the respective pistons, and arranged to be alternately compressed by the piston movements in respect to said valve, and to alternately operate said valve when released.

4. In a milking apparatus, the combination with a milk tube and means for producing partial vacuum therein, of a group of double-chambered teat cups, and a pulsator mechanism comprising co-axial cylinders and a valve casing connecting said cylinders, piston heads working in the respective cylinders and connected by a piston rod extended through said valve casing, a valve slidable along said piston rod, automatic lock dogs operative alternately on said valve to secure the same in extreme positions, a trip for said dogs actuated by said piston rod at extreme movements of said pistons to alternately release said dogs, springs on said piston rod compressed between said valve and the respective piston heads, and arranged to be alternately compressed, and when released, acting to move said valve, said valve seat having an intermediate port connected to said milk tube and outside ports connected to the ends of said cylinders and to the air chambers of said teat cups, the other chambers of said teat cups being in constant connection with said milk tube.

5. In a milking apparatus, the combination with a milk line tube in which partial vacuum or suction is maintained, of a group of teat cups connected to the extended or receiving end of said milk line tube and a pulsator mechanism also at the extended end of said milk line tube, said pulsator mechanism including a double ended vacuum motor and valve mechanism actuated thereby, the opposite sides of said vacuum motor being connectable to the atmosphere and the said milk line, alternately and in reverse order, through said valve mechanism.

6. In a milking apparatus, the combination with a milk line tube in which partial vacuum or suction is maintained, of a group of teat cups connected to the extended or receiving end of said milk line tube and a pulsator mechanism also at the extended end of said milk line tube, said pulsator mechanism including a double ended vacuum motor and valve mechanism actuated thereby, the opposite sides of said vacuum motor being connectable to the atmosphere and the said milk line, alternately and in reverse order, through said valve mechanism, the said teat cups having inner chambers connected to said milk line and outer chambers, which, through said valve mechanism, are connected alternately and in reverse order to the atmosphere and to said milk line.

In testimony whereof I affix my signature in presence of two witnesses.

LAURITS DINESEN.

Witnesses:
CLARA DEMAREST,
BERNICE G. BAUMANN.